Oct. 31, 1967     L. E. GALLAHER ET AL     3,350,628
CURRENT REGULATOR WITH A.C. AND D.C. FEEDBACK
Filed July 16, 1964                2 Sheets-Sheet 1

INVENTORS: L. E. GALLAHER
R. J. REDNER

ATTORNEY

United States Patent Office 3,350,628
Patented Oct. 31, 1967

3,350,628
CURRENT REGULATOR WITH A.C. AND D.C. FEEDBACK
Lee E. Gallaher and Richard J. Redner, Middletown, N.J., assignors to Bell Telephone Laboratories, Incorporated, New York, N.Y., a corporation of New York
Filed July 16, 1964, Ser. No. 383,038
8 Claims. (Cl. 323—4)

ABSTRACT OF THE DISCLOSURE

Constant current is supplied to a load from a regulated power supply of the type employing a transistor switch connected between the source and the load. The switch is driven by a Schmitt trigger, which is responsive not only to a first feedback signal derived from deviations from a desired value of the current supplied to the output filter but also to a second feedback signal. The second feedback signal is an alternating-current signal derived from the switching action of the transistor and applied in a sense to reduce the hysteresis of the trigger circuit. A higher frequency of operation than otherwise feasible can thus be maintained; and filtering of the output current is facilitated.

---

This invention concerns improvements in switching regulators, particularly those regulators that supply a constant current to a load.

It has heretofore been observed that voltage may be very efficiently regulated by connecting a switch in series between the source and the load and controlling the opening and closing of the switch to oppose variations in the output voltage. Such regulators vary the ratio of "on" time to "off" time of the switch. If the frequency of switching nevertheless remains substantially constant, it is said that the duty cycle is varied. In some regulators, both the ratio of "on" time to "off" time of the switch and its frequency are varied to provide a more rapid correction of the output voltage. These principles may be extended to current regulation with the aid of an appropriate current sensing element and a filter which averages the square wave of current produced by the switch.

Filtering of such a current waveform may be accomplished with components of reasonable size if the frequency of operation is sufficiently high, e.g., in excess of 100 kilocycles per second. Yet it is desirable to obtain full correction of the output current during each switching cycle. While full correction of the output current during each cycle may be achieved in a switching reglator of the type in which both the ratio of "on" time to "off" time and the frequency vary, this type of regulator usually must operate at a normal frequency so low that filtering is difficult.

Accordingly, it is an object of this invention to maintain the frequency of operation of a switch in a switching regulator sufficiently high to afford simple filtering and nevertheless to obtain full correction of the output current every cycle.

According to the invention, a switch in a switching regulator is driven by a trigger circuit such as a Schmitt trigger. The trigger in turn is driven by a signal responsive to the total filtered, i.e., "direct," current in the load and by a signal responsive to an alternating current produced by the switch. The latter signal drives the switch toward its closed condition when open and toward its open condition when closed. In normal operation, the signal responsive to an alternating current produced by the switch will traverse a substantial portion of the hysteresis of the Schmitt trigger and produce a much higher frequency of operation than is obtainable in its absence. This cooperation is facilitated if the alternating-current responsive signal is derived from a portion of the circuit preceding the filter, so that this signal is unfiltered. If the output current is changed, this alternating-current responsive signal will nevertheless permit the frequency of switching to vary in response to the direct-current feedback signal to facilitate rapid correction of the output current.

As a feature of the invention, the input of the feedback circuit that is responsive to the alternating component of the load current is connected across a first resistor in series with the switch, the series combination being connected in parallel with a current shunt that supplies current to the output filter when the switch is open. The input of the direct-current feedback circuit is connected across a second resistor that is in series with the aforesaid parallel combination and the output filter.

The current shunt has an impedance substantially larger than that of the first resistor, so that the current supplied to the filter tends to alternate between the shunt and the first resistor as the switch is opened and closed. A substantially square-wave voltage signal is produced across the first resistor. This alternating signal is applied through its feedback circuit to the Schmitt trigger to drive the Schmitt trigger toward its other switching limit as soon as it has changed its state at one switching limit. This tendency will be increased as the total output current increases and will be decreased as the total output current decreases. The direct-current signal is applied to the trigger in the conventional negative feedback sense.

The two feedback circuits cooperate so that the square-wave signal reduces the trigger circuit hysteresis to make the normal frequency of switching sufficiently high for good filtering; while the direct-current feedback signal changes both the ratio of "on" time to "off" time and the frequency to enable correction of the output current within one switching cycle of the current switch.

A fuller appreciation of the invention may be gained from the following detailed description and the accompanying drawings, in which.

Figure 1:
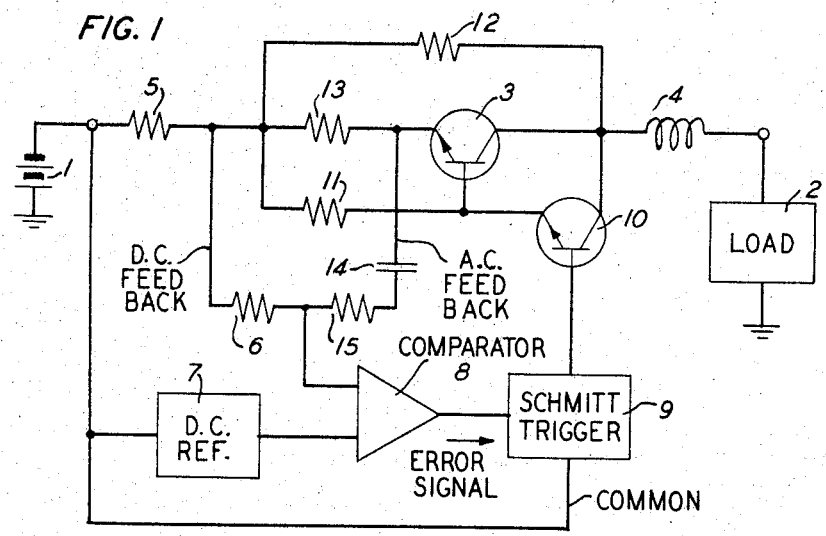
FIG. 1 is a simplified block diagrammatic and schematic illustration of a preferred embodiment of the invention.

In the circuit of FIG. 1, source 1 supplies to a load 2 a current having a magnitude regulated by the timing of the opening and closing of a transistor switch 3. When transistor 3 is conducting, the switch is closed; and, when transistor 3 is not conducting, the switch is open.

It should be noted that load 2 may be subject to changes of impedance, either regularly, or as an unpredictable transient commonly called a disturbance. In particular, circuits according to the present invention are especially well suited for supplying regulated bias and drive currents to loads such as the coincident current type of magnetic memory.

Switch 3 is connected serially with a filter inductance 4 between source 1 and load 2. A current shunt 12 is connected across the emitter-collector path of switch 3. In one embodiment of the invention, switch 3 was a parallel set of three, high-frequency medium-power epitaxial type of transistors such as the type 20D, manufactured by Western Electric Company, Incorporated. A load current sensing resistor 5 is connected serially between source 1 and the parallel combination of switch 3 and shunt 12 and carries all of the load current.

A D.C. feedback resistor 6 is connected from the junction of resistor 5 and shunt 22 to one input of a comparator 8. A D.C. reference voltage source 7 is connected to another input of comparator 8. The output of comparator 8 is connected to the input of a Schmitt trigger 9; and the output of Schmitt trigger 9 is connected to the input of driver amplifier transistor 10 That is, the non-common output terminal of Schmitt trigger 9 is connected to the base of transistor 10. A transistor 10 is connected as an emitter-follower amplifier with output resistor 11 connected across the input of switch 3 from the base electrode thereof to the junction of resistor 5 and shunt 12. The collector of transistor 10 is connected to the collector of transistor 3 so that the emitter-collector circuit of transistor 10 is in a series circuit between resistor 5 and load 2. Consideration of phase relationships around the D.C. feedback loop will show that it is a negative feedback arrangement and will tend to limit current variations in resistor 5 and load 2, as will be more fully explained below.

According to the invention, the feedback circuitry is arranged in part as follows. A resistor 13 is connected in series with the collector-emitter path of switch 3 across shunt 12 to sense the unfiltered current supplied through switch 3 to filter 4. The resistance of switch current switching resistor 13 is preferably, but not necessarily one or two orders of magnitude smaller than the resistance of resistor 12, so that shunt 12 is substantially deprived of current when switch 3 is closed. The A.C. feedback circuit also provided according to the invention comprises a blocking capacitor 14 and a resistor 15 connected serially between the first input of comparator 7 and the junction of switch current sensing resistor 13 with the emitter of switch 3. It may be seen that resistors 15 and 6 form a voltage divider connected across resistor 13 by way of capacitor 14 for applying the A.C. voltage variations across resistor 13 to the first input of the comparator 8. It may be seen that resistor 6 and comparator 8 are circuitry used in common by both the A.C. and D.C. feedback circuits to drive Schmitt trigger 9.

Comparator 8 and Schmitt trigger 9 may be constructed and arranged in a variety of ways well known in the art. Preferred forms of these apparatuses are specifically illustrated in FIG. 3 and will be discussed hereinafter.

For purposes of a basic description of the operation of the circuit of FIG. 1, the relevant characteristics of Schmitt trigger 9 are that it is triggered to a first state by error signals higher than a first value and remains in the first state until triggered to a second state by error signals below a second value. It then remains in the second state until retriggered to the first state. The first value is usually called the upper switching limit, and the second value is referred to as the lower switching limit. The difference between them is commonly called the hysteresis of the Schmitt trigger and is inherent in the circuit. The upper and lower switching limits are the indicated bounds of curve 23 of FIG. 2.

In operation, current will flow from source 1 through load current sensing resistor 5, either shunt 12 or the series combination of resistor 13 and switch 3, then filtering inductor 4 and load 2. The resistance of shunt 12 is preferably a substantial portion of the resistance in the circuit it forms with the load; while the resistance of resistor 13 is preferably a negligible portion of the resistance in the circuit it forms with the load when switch 3 is closed. The steady state current that can be supplied through shunt 12 is then less than the regulated current desired at load 2; and the steady state current that can be supplied through resistor 13 and switch 3, when closed, to load 2 is considerably greater than the desired regulated value. The induced voltage of filtering inductor 4 opposes the load current flow when switch 3 is closed and aids the load current flow when switch 3 is opened to average or smooth the varying current received by it.

Figure 2:
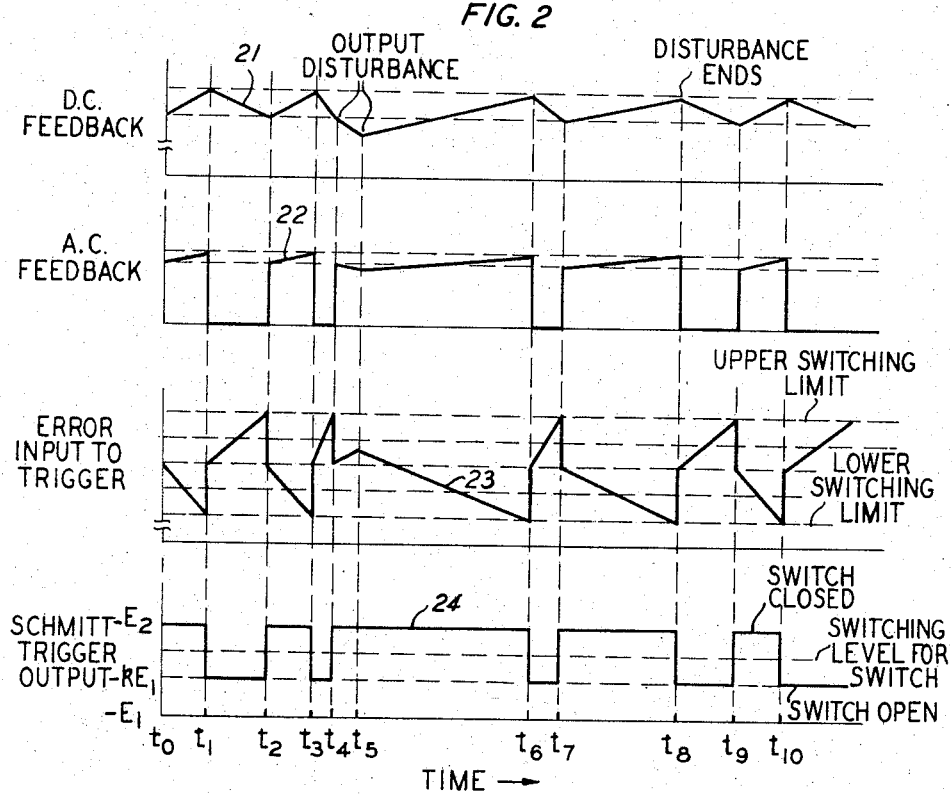
FIG. 2 shows curves informative of the principles of operation of the circuit of FIG. 1.

The curves of FIG. 2 of the drawing illustrate the potentials existing at various points in the subject regulator under the several conditions of operation to be described. The operation of the circuit may best be understood by tracing through the changes which occur in the circuit, first when the load impedance is constant (times $t_0$ through $t_3$ and $t_8$ through $t_{10}$ in FIG. 2) and then when changes in load impedance or other changes produce a "disturbance" (times $t_3$ through $t_8$).

Since the voltage across resistor 5 is directly proportional to the load current and the D.C. feedback signal is derived from the potential across resistor 5, it may be seen from curve 21 of FIG. 2 that the load current is increasing from time $t_0$ to $t_1$. The circuit is so arranged that during the same time period, Schmitt trigger 9 produces the higher one of its two output voltages, which is sufficient to forward-bias the base-emitter junction of transistor 10. A small part of the load current will flow through the collector and emitter of transistor 10 and resistor 11. The voltage across resistor 11 is then sufficient to forward-bias the base-emitter junction of transistor 3 and drive transistor 3 into conduction. The potential of the collector of transistor 3 accordingly drops to a level that severely limits the collector-to-emitter bias of transistor 10. It has been found that this interaction limits the degree of saturation of the transistors and makes it possible to turn off transistors 10 and 3 much more quickly than is possible in most transistor switching regulators.

Between $t_0$ and $t_1$, the unfiltered voltage across resistor 13 increases as the load current increases, as shown by curve 22 of FIG. 2, since the split of current between the branches including resistors 12 and 13 remains fairly constant while transistor 3 is conducting. The voltage across blocking capacitor 14, which is substantially constant for the contemplated frequencies of operation of the circuit of FIG. 1, is subtracted from the voltage across resistor 13. A fixed fraction of the remainder appears at the first input of comparator 8 at the junction of resistors 6 and 15, in addition to a fraction of the voltage across resistor 5. The total voltage at the junction of resistors 6 and 15 is subtracted from the voltage of D.C. reference source 7 by comparator 8, with the result that the error signal applied to Schmitt trigger 9 is decreasing from line $t_0$ to $t_1$ as shown in curve 23 of FIG. 2.

At time $t_1$, the error signal reaches the lower switching limit of the Schmitt trigger, which then switches and produces the lower of its two output voltages as shown in curve 24 of FIG. 2. This voltage reverse biases transistor 10 and open switch 3. The current through resistor 13 is cut off, as shown in curve 22; and the error signal from the comparator instantaneously jumps upward by a substantial amount, as shown in curve 23.

As the output current decreases as shown in curve 21 from time $t_1$ to $t_2$, the error signal rises until the upper switching limit of the Schmitt trigger is reached, as shown at time $t_2$ on curve 23. The Schmitt trigger output voltage rises, as shown in curve 24; and, as described above, switch 3 is closed. The sudden reappearance of voltage across resistor 13 causes the error signal to jump downward at time $t_2$.

In each case, the "jump" caused by the A.C. component of the error signal starts to drive the Schmitt trigger 9 toward its opposite switching limit so that a smaller direct current ripple suffices to traverse the hysteresis of the trigger than in the absence of any A.C. feedback. Since the A.C. signal reduces the output current ripple for a given hysteresis of the Schmitt trigger 9, the trigger may be quite simply designed with a rather large hysteresis; and yet a small output ripple may be achieved.

According to the invention, the A.C. feedback signal makes it possible to obtain rapid correction of the load current without the use of excessive gain in the D.C. feedback circuit. The "jumps" in the error signal that are attributable to the A.C. feedback signal are only about one-half of the hysteresis of the Schmitt trigger; and thus these "jumps" cannot possibly switch the Schmitt trigger on a continuous basis. It is apparent that the variation of the D.C. feedback signal in response to the load current effectively controls Schmitt trigger merely by completing the variation of the error input signal through the indicated hysteresis between upper and lower switching limits.

Moreover, the A.C. feedback signal has a very marked effect in determining the normal operating frequency. It may be noted that, if the sloping portions of curve 23 attributable primarily to the D.C. feedback signal were required to traverse the entire hysteresis, the frequency would evidently be much lower. It appears that if the normal "jump" of the A.C. component of the error signal is $1/M$ times the voltage hysteresis of the Schmitt trigger 9, then the normal switching frequency is approximately $$\frac{M}{M-1}$$

times whatever the frequency would be without any A.C. feedback. For example, a circuit operating at a switching rate of only 125 kc. s. without any A.C. feedback at all will operate at 250 kc. s. with a normal "jump" of the A.C. component equal to one-half of the hysteresis. This relationship may also be derived by geometrical considerations from the portion of curve 23 preceding time $t_3$. Thus, the D.C. feedback signal is predominant in providing full correction of the output current during every switching cycle while the A.C. feedback signal provides a simple and effective means of setting the normal operating frequency at a sufficiently high level to afford simple filtering.

The regulatory effect during a transient disturbance of the output current is illustrated by the curves of FIG. 2 beginning at time $t_3$. Persistence of the disturbance may cause the output current to continue to fall from time $t_4$ to $t_5$, even though switch 3 has been closed by circuit action described above. Consequently, after an initial jump, the voltage across resistor 13 falls. A corresponding variation of opposite sense occurs in the error signal, as shown by curve 23. When the output current starts to rise again, the error signal decreases from a voltage much nearer the upper switching limit of trigger 9 than is normal. The effect is similar to that of a downward jump from the upper switching limit of less than normal amount and may be identified at time $t_5$ on curve 23 as a reduced "jump" caused by the A.C. component of the composite error signal. A longer than normal time elapses before the error signal reaches the lower switching limit at time $t_6$. After time $t_6$, the "jumps" of the error signal have returned to normal magnitude; but the continuing load disturbance still has sufficient effect on both the A.C. and D.C. feedback signals, as shown in curves 22 and 21, respectively, that the frequency of switching remains lower than normal until the load disturbance disappears.

Figure 3:
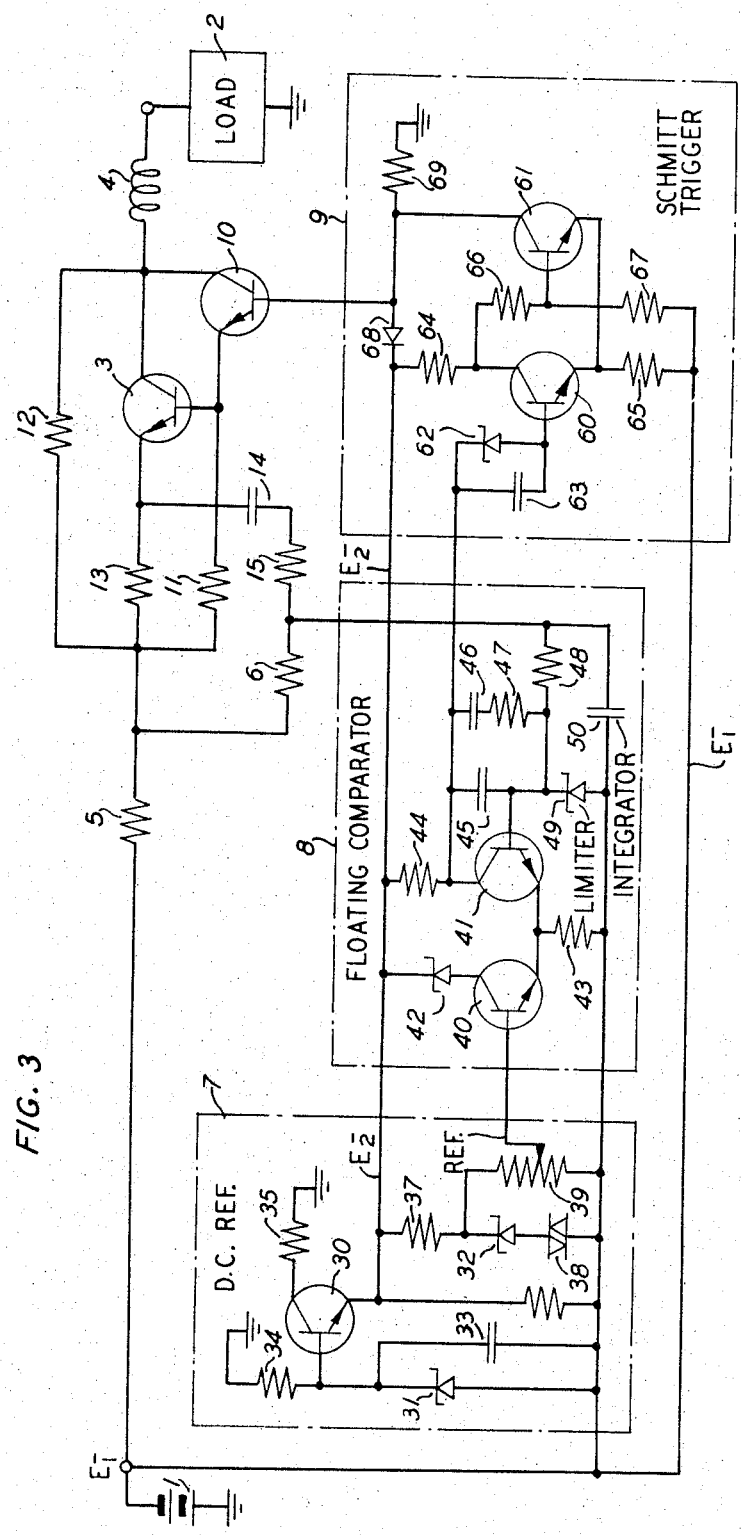
FIG. 3 is a specific schematic version of the embodiment of FIG. 1.

In FIG. 3 specific circuits are shown for D.C. reference source 7, comparator 8, and Schmitt trigger 9 of FIG. 1.

D.C. reference source 7 comprises cascaded Zener diode regulators including diodes 31 and 32 with a buffer amplifier transistor 30 cascaded therebetween. A resistor 34 and a Zener diode 31 are connected serially across source 1 so that resistor 34 absorbs most of the voltage variation of source 1. A capacitor 33 is connected across Zener diode 31, as is also the series combination of base-emitter junction of a transistor 30 and a resistor 36. A resistor 35 is connected between the collector of transistor 30 and ground. A resistor 37, Zener diode 32 and varistor 38 are connected serially across emitter resistor 36, so that resistor 37 absorbs most of the voltage variation across resistor 36. Varistor 38 compensates Zener diode 32 for temperature variations. Buffer amplifier transistor 30 reduces current variations in the Zener diodes.

A voltage divider 39, connected across Zener diode 32 and varistor 38, has a variable tap that is connected to the reference voltage input of a comparator 8, the base of transistor 40. In addition to supplying the reference voltage, source 7 also supplies from the emitter of transistor 30 the collector voltage $E_2$ for comparator transistors 40 and 41 and Schmitt trigger transistor 60.

Comparator 8 is called a floating comparator because it has no internal grounds. This is possible because the reference voltage is stabilized with respect to the ungrounded terminal of the supply to permit a loop circuit between the inputs of the comparator 8 that does not include the supply voltage.

A resistor 43 is connected between the emitters of transistors 40 and 41 and the negative terminal of the supply 1; and a Zener diode 42 and a resistor 44 are connected as voltage dropping elements between the $-E_2$ negative supply point at the emitter of transistor 30 and the respective collectors of transistors 40 and 41. Since the output of comparator 8 is taken from the collector of transistor 41, it is seen that transistors 40 and 41 form a differential amplifier type of comparator.

A Zener diode 49 is connected between the base of transistor 41 and the negative terminal of supply 1 in a polarity to limit the voltage excursions of the combined feedback signals in the sense that increases the base current of transistor 41. A high frequency shaping capacitor 45 is connected from the collector to the base of transistor 41 to attenuate noise at the base of transistor 41. A blocking capacitor 46 and a feedback resistor 47 are connected from the collector to the base of transistor 41 to provide local negative feedback for signal variations. A resistor 48 is connected between the base of transistor 41 and the junction of D.C. feedback resistor 6 and A.C. feedback resistor 15 to limit the current drawn from the latter resistors if Zener diode 49 breaks down on excessive signal excursions.

A capacitor 50 is connected from the junction point of resistors 6 and 15 to the negative terminal of supply 1. Capacitor 50 forms in combination with each of the resistors 6 and 15 a different partial integrator or proportional-plus-integral network for the respective D.C. and A.C. feedback signal components originally derived across resistors 5 and 13, respectively. The integrated portion of each signal component is kept relatively small compared to the proportional portion by appropriate choices of the time-constants or resistance-capacitance products of capacitor 50 with resistors 6 and 15, respectively. The net effect is to reduce the frequency of switching slightly and substantially reduce the effect of noise in the feedback circuits. In one particular circuit operating at 250 kc. s., resistor 6 was 56.2Ω, resistor 15 was 392Ω and capacitor 50 was .03μf.

In Schmitt trigger 9, the base of a transistor 60 is connected through the parallel coupling network of Zener diode 62 and capacitor 63 to the collector of transistor 41 in the comparator 8. The anode of a Zener diode 62 is connected to the base of transistor 60. A resistor 65 is connected between the emitters of transistors 60 and 61 and the negative terminal of supply 1 and is not by-passed. This connection makes the trigger 9 an emitter-coupled binary circuit. A resistor 64 is connected between the $-E_2$ supply point and the collector of transistor 60. Resistors 66 and 67 are connected serially as a voltage divider between the collector of transistor 60 and the negative terminal of supply 1; and the base of transistor 61 is connected to the junction of resistors 66 and 67. A resistor 69 and a diode 68 are connected serially between ground and the $-E_2$ supply point, and the cathode of a diode 68 is connected to the $-E_2$ supply point. The collector of transistor 61 is connected to the anode of diode 68 and is also connected to the base of driver transistor 10.

The operation of Schmitt trigger 9 is illustrated by curves 23 and 24 of FIG. 2. When switch 3 is closed, the error signal to the trigger usually is falling in response to a rising output current. Transistor 60 is conducting; and transistor 61 is nonconducting, so that its collector potential is clamped to the $-E_2$ voltage by diode 68. The lower switching limit is reached when transistor 60 approaches so near to cut-off that its falling emitter potential and rising collector potential cause the voltage across resistor 67 to be greater than the voltage across resistor 65. At this point, the base-emitter junction of transistor 61 is forward-biased. Collector-emitter current flows in transistor 61, and the resulting increase in voltage across resistor 65 drives transistor 60 still closer to cut-off. The collector voltage of transistor 60 and the voltage across resistor 67 are increased by greater increments than the voltage across resistor 65; and the cut-off of transistor 60 and saturation of transistor 61 are regenerative. The collector voltage of transistor 61 stabilizes at $-KE_1$ where K is approximately the ratio of the resistance of resistor 69 to the sum of resistances of resistors 69 and 65. This collector voltage of transistor 61 suffices to cut off transistor 10 and open switch 3. A similar regenerative switching action of reverse nature occurs as the error signal approaches the upper switching limit of the Schmitt trigger 9.

The inventive cooperation of the circuit of FIG. 3 is the same as that described above for the generalized circuit of FIG. 1. In summary, a disturbance that persists sufficiently to depress the output current will reduce the magnitude of the D.C. component of the error signal and reduce the operating frequency, even though the A.C. feedback signal plays a major role in determining the normal operating frequency to reduce the output ripple. The drastically reduced frequency of operation permits a high ratio of switch conduction time to nonconduction time even when the switching transients are an appreciable portion of the normal switching period.

It clearly would be within the skill of one skilled in the art to modify the circuits of FIG. 1 and FIG. 3 to sense the total output current on the output side of either switch 3 or filter 4. The output filter could also be made partially capacitive provided the current sensing element for the D.C. feedback circuit is positioned to sense the true load current. The A.C. and D.C. feedback circuits could be isolated from each other; and various modifications of reference source 7, comparator 8, and trigger 9 could be made. It would appear that the trigger circuit preferably should have a constant hysteresis in order to take full advantage of the variation in magnitude of the feedback signals. It is also possible for the A.C. feedback circuitry to sense current variations in the current shunt 12 as well as in the switch 3.

In all cases it is understood that the above-described arrangements are illustrative of a small number of of the many possible specific embodiments that can represent applications of the principles of the invention. Numerous and varied other arrangements can readily be devised in accordance with these principles by those skilled in the art without departing from the spirit and scope of the invention.

What is claimed is:

1. Apparatus for supplying current from a source to an output circuit, comprising a switching device connected between said source and said output circuit, a filter circuit connected between said switching device and said output circuit, a binary trigger circuit connected in controlling relationship to said switching device, means for sensing total current supplied from said source to said filter, means responsive to said sensing means for applying to said trigger circuit a first feedback signal of a sense to oppose a variation in said total current, said trigger circuit exhibiting hysteresis in controlling said switching device in response to said variation in said output circuit, means forming a parallel circuit with said switching device for supplying curent between said source and said filter when said switching device is open, and means coupled to said parallel circuit for supplying to said trigger circuit a second feedback signal responsive to a change of current produced between said source and said filter by said switch, said second feedback signal being of a sense to drive said switching device toward its open condition when closed and toward its closed condition when open.

2. An apparatus according to claim 1 in which the second feedback signal applying means includes a direct-current blocking device connected between said parallel circuit and the first feedback signal applying means, said first and second feedback signal applying means having circuitry in common.

3. Apparatus for supplying current to a load from a source of voltage, comprising a switching device connected serially between said source and said load, a filter connected between said switching device and said load, means for deriving a first signal responsive to the total current in said load, a binary trigger circuit having an input coupled to said first signal deriving means and having an output coupled to said switching device in a polarity to oppose changes in said first signal, said trigger circuit inherently possessing hysteresis, means forming a parallel circuit with said switching device for supplying current to said filter when said switching device is open, and means for establishing the normal frequency of switching of said switching device comprising means coupled to said parallel circuit for deriving a second signal responsive to an alternating-current component of the current supplied to said filter, means for applying said second signal to said binary trigger circuit in a sense to facilitate repeated switching of said switching device, and means for proportioning said second signal to have a peak-to-peak magnitude smaller than said hysteresis of said trigger circuit, whereby disturbances of said total current can be effective to change the frequency of switching of said switching device from said normal frequency.

4. Apparatus for supplying regulated current to a load from a source of voltage, comprising a switching device connected between said source and said load, a filter connected between said switching device and said load, a current sensing device connected serially between the source and the load to sense the total current flowing to the load, a binary trigger circuit having an output connected to said switching device and having an input for receiving an error signal, said trigger circuit being adapted to change from a first stable state to a second stable state as said error signal falls below a first level and to change from said second stable state to said first stable state as said error signal rises above a second level that is greater than said firt level, first feedback means responsive to said current sensing device for supplying a first portion of said error signal, and second feedback means responsive to an alternating current produced by the switching of said switch for supplying a second portion of said error signal, said second feedback means being adapted to drive said switching device toward its first stable state immediately following a change to said stable state and toward its second stable state immediately following a change to said first statble state, said second feedback means being proportioned so that said second portion of said error signal is less than the difference between said first and second error signal levels.

5. Apparatus according to claim 4 in which the switching device is connected serially between the source and the load, and the second feedback means comprises a direct-current blocking circuit having an input connected in said apparatus to receive an unfiltered signal and having an output coupled to said trigger circuit.

6. In combination, a source of voltage, a load, a filter connected between said source and said load, a transistor switch connected serially between said source and filter, means for shunting current around said switch when said switch is open, means for deriving a signal responsive to a signal that is filtered by said filter, means for deriving a reference signal, means for deriving a substantially square-wave signal responsive to the current change in said switch, means for combining said signal responsive to said filtered signal and said square-wave signal, means for comparing said combined signals with said reference signal to derive an error signal, and means for applying said error signal to said switch in a sense to maintain said combined signal within fixed limits, said combining means being proportioned to permit said square-wave signal to have a substantial effect in determining the normal frequency of operation of said switch and to permit said signal responsive to said filtered signal to vary the frequency of operation of said switch in response to disturbances of said total current.

7. A combination according to claim 6 in which the error signal applying means includes a binary trigger circuit having a constant hysteresis and a driver circuit cascaded between said trigger circuit and said transistor switch, said driver circuit being biased by voltage across said transistor switch in a sense to tend to limit saturation of said transistor switch, whereby the frequency of operation of said transistor switch may be substantially increased.

8. A combination according to claim 7 in which the square-wave signal deriving means includes a resistive device connected in a closed loop with said transistor which and said shunting means, said current change signal deriving means including a capacitor connected between said resistive device and the combining means to tend to block the average value of voltage across said resistive device from said combining means, whereby said current change signal tends to drive said transistor switch toward its conductive condition when nonconductive and toward its nonconductive condition when conductive.

References Cited
UNITED STATES PATENTS

| | | | |
|---|---|---|---|
| 2,810,105 | 10/1957 | Henrich | 323—38 |
| 3,109,979 | 11/1963 | Faulkner et al. | 323—22 |
| 3,223,915 | 12/1965 | Ryerson et al. | 323—22 |

OTHER REFERENCES

Electronics Design, February 1961, pp. 30, 32.

JOHN F. COUCH, *Primary Examiner.*

M. L. WACHTELL, *Assistant Examiner.*